United States Patent [19]
Cho

[11] Patent Number: 5,894,902
[45] Date of Patent: Apr. 20, 1999

[54] SELF-PROPELLED WHEEL FOR WHEELED VEHICLES

[75] Inventor: Chahee P. Cho, Portsmouth, R.I.

[73] Assignee: The United States of America as represented by the Secretary of the Navy, Washington, D.C.

[21] Appl. No.: 08/706,591

[22] Filed: Sep. 5, 1996

[51] Int. Cl.$^6$ .................................................. B60K 1/00
[52] U.S. Cl. ................................. 180/65.5; 310/67 R
[58] Field of Search ............................ 180/65.5, 65.1, 180/65.6, 65.7; 310/67 R, 67 A, 74, 75 R, 68 R

[56]  References Cited

U.S. PATENT DOCUMENTS 3,566,165  2/1971  Lohr ............................... 180/65.5
5,600,191  2/1997  Yang ............................... 310/67 R
5,625,241  4/1997  Ewing .............................. 310/67 R

*Primary Examiner*—Robert J. Oberleitner
*Assistant Examiner*—C. J. Bartz
*Attorney, Agent, or Firm*—Michael J. McGowan; Prithvi C. Lall; Michael F. Oglo

[57] ABSTRACT

A self-propelled wheel for wheeled vehicles includes an axle, a stator drum fixed to the axle, and a wheel hub and rim rotatably mounted on the axle. Permanent magnets are fixed on the wheel and oppose an outer lateral face of the stator drum and an outer peripheral edge of the stator drum. Excitation of the stator drum causes the permanent magnets, and thereby the wheel, to rotate on the axle.

4 Claims, 3 Drawing Sheets

5,894,902

SELF-PROPELLED WHEEL FOR WHEELED VEHICLES

STATEMENT OF GOVERNMENT INTEREST

The invention described herein may be manufactured and used by or for the Government of the United States of America for governmental purposes without the payment of royalties thereon or therefor.

BACKGROUND OF THE INVENTION (1) Field of the Invention

The invention relates to electrically powered vehicles and is directed more particularly to a self-propelled electrically driven wheel for such vehicles.

(2) Description of the Prior Art

In response to environmental and geopolitical problems, it has become of some urgency to make available a vehicle consuming relatively less fossil fuel than current fossil-fuel vehicles. While the ultimate target remains "zero-emissions" vehicles which utilize virtually no fossil fuel, realization of that goal appears far removed because of lack of progress in development of batteries capable of propelling a vehicle for times and distances, and at speeds, the driving public has come to expect.

It is now believed that in the interim hybrid vehicles utilizing a combination of a fossil-fueled engine and electric drive means may well be the answer, falling short of "zero-emissions", but nevertheless greatly increasing the distance one can travel on a gallon of fossil fuel. One such concept includes providing an electric motor for each wheel, the motors being driven by a generator which, in turn, is driven by a fossil-fuel engine. In such instance, the engine can be run solely for benefit of the generator and therefore can be small and run at a constant most efficient speed, greatly reducing fossil fuel requirements. To reduce the fossil fuel requirements further, it is necessary that the wheel motors be as efficient as possible.

Two types of rotary electrical motors have been considered, the axial permanent magnet motor and the radial permanent magnet motor. While there are numerous embodiments of both types, in general the axial permanent magnet motors feature a stator disk, or drum, with a central opening and electrical conductor windings wound through the central opening and across the outer peripheral edge of the stator disk. The stator disk typically is fixed in place. A rotor usually is mounted on a shaft and is proximate to the stator disk. The rotor is provided with permanent magnets extending radially from the center of the rotor. In operation, a polyphase alternating electrical current passed through the windings of the stator disk creates a magnetic flux, to which the permanent magnets of the rotor respond, to cause turning of the rotor and the shaft to which the rotor is fixed. The portion of the windings overlying the outer peripheral edge of the stator disk do not accomplish useful work. The magnetic field generated by the windings on the outer peripheral edge of the stator is not coupled with any of the permanent magnets in the rotor and is therefore wasted.

In general, in radial permanent magnet motors, the stator is annularly-shaped and is concentrically disposed around a generally cylindrically-shaped rotor. The stator is provided with electrically conductive windings wound about and in between teeth which extend radially inwardly from the stator toward the rotor. Portions of the windings ("end-turn wire") extend around the outer periphery of the stator. The rotor is provided with permanent magnets of alternating polarity disposed around the periphery of the rotor. The permanent magnets of the rotor react to a magnetic field created by current through the stator windings, to cause the rotor to turn. The rotor generally is connected to a shaft which turns with the rotor and accomplishes work. In the radial motor, the end-turn wires of the stator are not useful in creating the magnetic field which couples with the rotor permanent magnets.

Thus, there is a need for an efficient motor-wheel for vehicles at least in part electrically powered, and there is a need for more efficient motor components for use in such a vehicle wheel.

SUMMARY OF THE INVENTION

It is, therefore, an object of the invention to provide a self-propelled wheel for vehicles powered at least in part by electricity.

A further object of the invention is to provide a motor assembly which is more efficient than the presently available axial permanent magnet motors and radial permanent magnet motors and which is well suited for use in the self-propelled wheel.

With the above and other objects in view, as will hereinafter appear, a feature of the present invention is the provision of a self-propelled wheel for wheeled vehicles, the wheel comprising an axle, a stator drum fixed to the axle, and a wheel hub and rim rotatable mounted on the axle. Permanent magnets are fixed on the wheel and oppose an outer lateral face of the stator drum and an outer peripheral edge of the stator drum. Excitation of the stator drum causes the permanent magnets, and thereby the wheel, to rotate on the axle.

The above and other features of the invention, including various novel details of the construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 1:
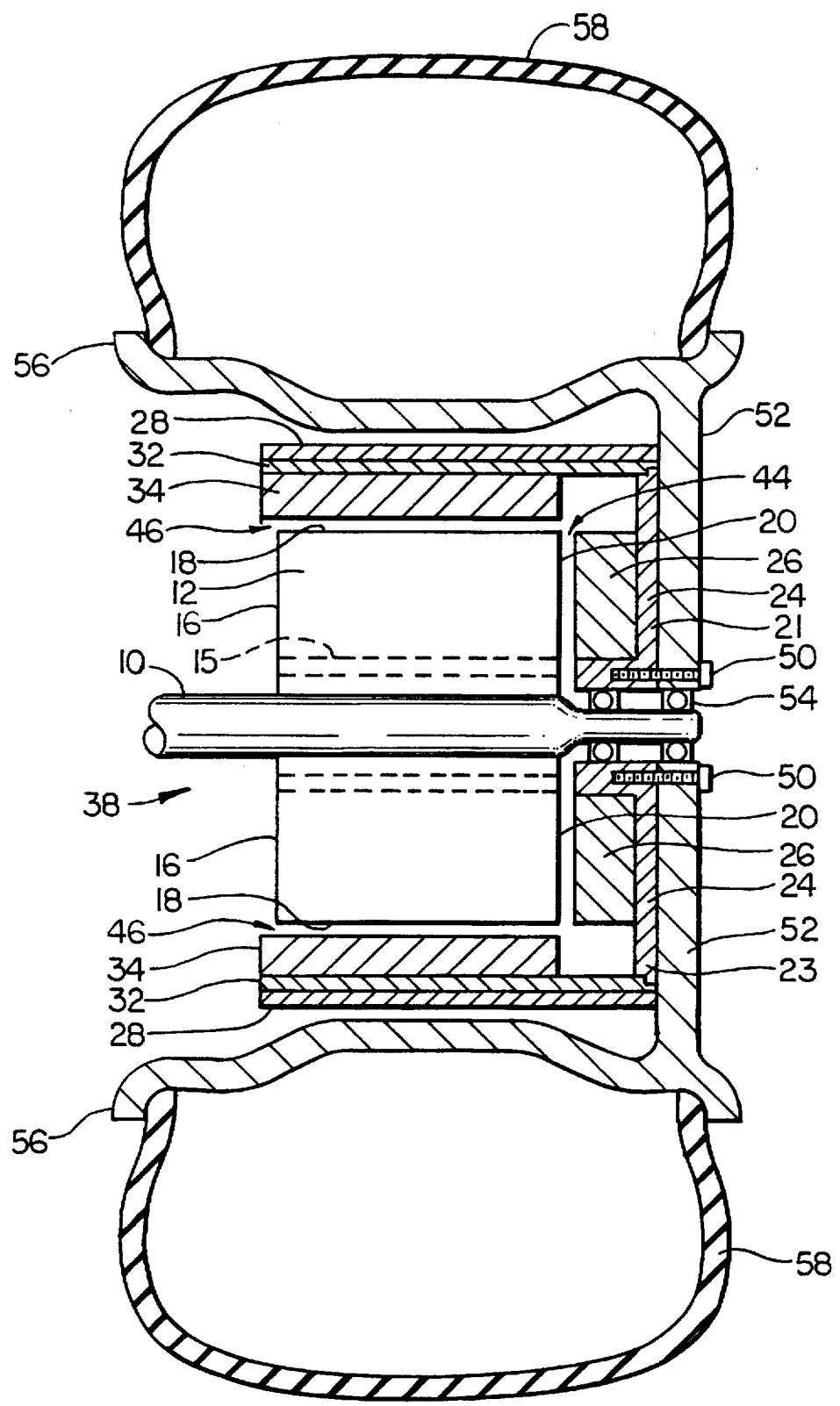
FIG. 1 is a sectional view of one form of self-propelled wheel illustrative of an embodiment of the invention.
Figure 2:
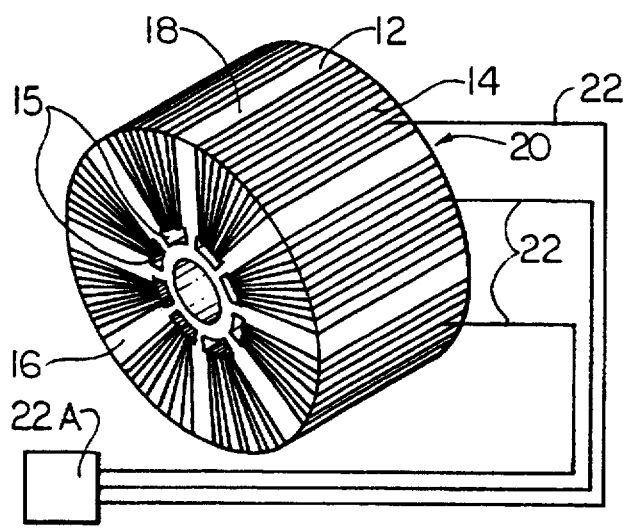
FIG. 2 is in part a perspective view of a stator of a motor portion of the wheel of FIG. 1, and in part a high level block diagram depiction of a polyphase electrical power source which excites windings of the stator.

Referring to FIG. 1, it will be seen that an illustrative embodiment of self-propelled wheel includes an axle 10 fixed to a chassis (not shown) of the vehicle (not shown). Fixed to axle 10 is an annularly-shaped stator drum 12 (FIG. 2) having a plurality of windings 14 extending through openings 15 in a central portion thereof, across an inner lateral face 16 of the stator drum, across the outer peripheral edge 18 of the stator drum, across an outer lateral face 20, and back to the central portion openings 15. The individual windings are electrically conductive wires formed as segments 22 of a torroid to receive excitations by a polyphase alternating electrical current source 22A with different phases exciting successively disposed windings, as is well known in the art.

Figure 3:
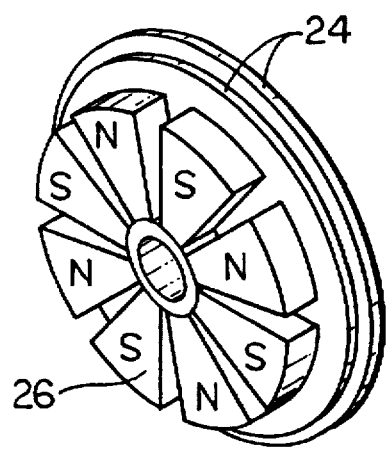
FIG. 3 is a perspective view of an axial rotor permanent magnet and backiron component of the motor portion of the wheel of FIG. 1.
Figure 4:
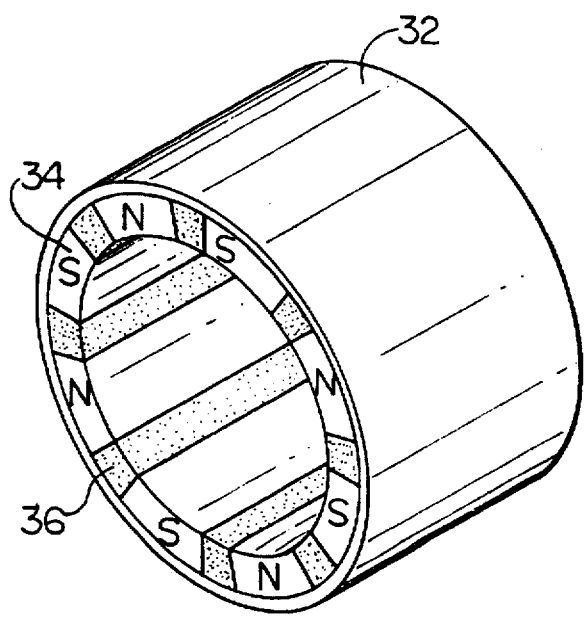
FIG. 4 is a perspective view of a rotor backiron and permanent magnet components of the motor portion of the wheel of FIG. 1.

Rotatably mounted on axle 10 is a rotor 21 including a rotor disk 23 and an outer end backiron 24 (FIGS. 1 and 3) having fixed thereon outer end permanent magnets 26 of alternating polarity. Fixed to rotor outer end backiron 24 and extending inwardly (leftwardly as viewed in FIG. 1) therefrom is a cylindrically-shaped outer backiron 32 having fixed thereon outer permanent magnets 34 of alternating polarity and having therebetween bodies 36 of epoxy, or other non-permeable material, as is known in the art.

Figure 5:
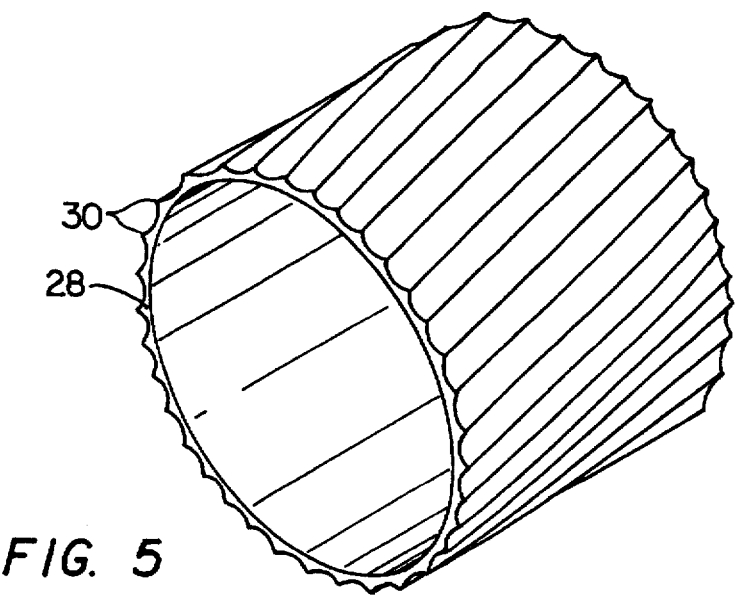
FIG. 5 is an end view of a rotor housing component of the motor portion of the wheel of FIG. 1.

Fixed on the outer surface of outer backiron 32 is a rotor housing 28 of a rigid material, preferably steel, which acts to retain rotor structural integrity and which further acts as a heat sink for the motor assembly. Referring to FIG. 5, it will be seen that rotor housing 28 may be provided with fins 30 for dissemination of heat.

The structure described thus far comprises a motor assembly 38 which provides increased efficiency and is ideally suited for use in self-propelled vehicles. The motor assembly 38 provides advantageous features of the radial type of permanent magnet motor configuration combined with advantageous feature of the axial type of permanent magnet motor and additionally provides better utilization of the flux field. More particularly the arrangement of the stator drum outer lateral face 20 and the rotor outer end permanent magnets 26 constitutes an axially configured type of permanent magnet motor, and the arrangement of rotor outer permanent magnets 34, and the torroidal stator winding segments 20 constitutes a radially configured type of permanent magnet motor. This enables utilization of the portion of the magnetic flux field wasted in a purely axial-type motor, and enables utilization of the portion of the magnetic flux created by the windings end-turns on the stator drum outer lateral face 20 wasted in a purely radial-type motor.

Figure 6:
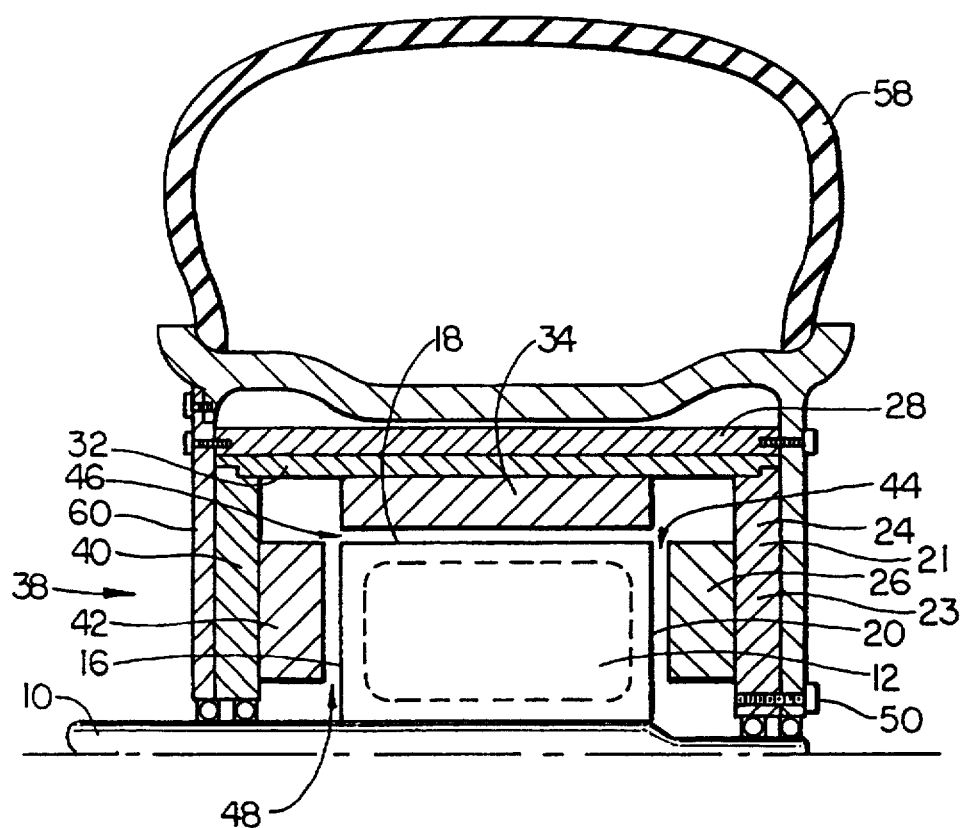
FIG. 6 is similar to FIG. 1, but shows half of an alternative embodiment of wheel, including components of an alternative embodiment of motor portion.

As is illustrated in FIG. 6, the magnetic flux created by the windings 14 on the inner lateral face 16 of stator drum 12 (FIG. 2) may be utilized by the addition of a rotor inner end backiron 40 having fixed thereon inner end permanent magnets 42.

Reference is again made to FIG. 1. The embodiment shown therein is provided with a first axial outer end air gap 44 defined by stator drum outer lateral face 20 (and windings thereon) and outer end permanent magnets 26, and a second radial air gap 46 defined by stator drum outer peripheral edge 18 (and windings thereon) and outer permanent magnets 34. Referring now to FIG. 6, the embodiment shown in the latter FIG. 6 is further provided with a third inner end axial air gap 48 defined by the stator drum inner lateral face 16 (and windings thereon) and inner end permanent magnets 42.

Referring once more to FIG. 1, it will be seen that releasably fixed to the rotor outer end backiron 24, as by bolts 50, is a wheel hub portion 52, which is rotatably mounted on axle 10, as by bearings 54. Fixed to wheel hub portion 52, or integral therewith, is a wheel rim portion 56 adapted to receive a tire 58.

In the embodiment shown in FIG. 6, there is further provided a second wheel hub portion 60 which supports the rotor inner end backiron 40 and inner end permanent magnets 42. The outer backiron 32 and rotor housing 28 are fixed to second wheel hub portion 60. While the embodiment of FIG. 6 provides efficiencies not realized by the embodiment of FIG. 1, the changing of wheels is much simpler with the FIG. 1 embodiment wherein by removing bolts 50, the wheel hub and rim portions 52, 56 may be removed and replaced.

There is thus provided a self-propelled wheel and an improved electric motor for use in such a wheel.

It is to be understood that the present invention is by no means limited to the particular constructions herein disclosed and/or shown in the drawings, but also comprises any modifications or equivalents within the scope of the claims. For example, while the improved permanent magnet electric motor of the present invention has been shown and described in conjunction with a wheel for wheeled vehicles, and while the motor is deemed to be particularly well suited for such purpose, it will be apparent that such motor improvements relate to motors generally, apart from the combinations of such motors with self-propelled wheel structures.

What is claimed is:

1. A self-propelled wheel for wheeled vehicles, said wheel comprising:

an axle;

a stator drum fixed to said axle;

a wheel hub and wheel rim portion rotatable mounted on said axle;

permanent magnets fixed on said wheel hub and rim portions and opposing an outer lateral face of said stator drum and an outer Peripheral edge of said stator drum;

a second wheel hub portion rotatably mounted on said axle and fixed to said wheel hub and rim portions; and permanent magnets fixed on said second wheel hub portion and opposing an inner lateral face of said stator drum;

whereby excitation of said stator drum causes said permanent magnets, and thereby said wheel, to rotate on said axle.

2. A self-propelled wheel for wheeled vehicles, said wheel comprising:

an axle;

a stator drum fixed to said axle;

a wheel hub and wheel rim portion rotatable mounted on said axle;

permanent magnets fixed on said wheel hub and rim portions and opposing an outer lateral face of said stator drum and an outer peripheral edge of said stator drum;

said stator drum being provided with torroidal winding segments which couple through magnetic fields with said permanent magnets opposing said outer lateral face of said stator drum forming therebetween a first axial gap, and said windings overlying said stator drum and with said permanent magnets opposing said stator drum peripheral edge forming therebetween a second radial gap; and a rotor rotatably mounted on said axle, said rotor comprising a rotor disk and a cylindrically-shaped rotor housing fixed to said rotor disk and extending therefrom to surround said stator drum outer peripheral edge, said wheel hub and rim portions being fixed to said rotor, said permanent magnets opposing said outer lateral face of said stator drum being fixed to said rotor disk, and said permanent magnets opposing said outer peripheral edge of said stator drum being fixed to said rotor housing;

whereby excitation of said stator drum causes said permanent magnets, and thereby said wheel, to rotate on said axle.

3. A self-propelled wheel for wheeled vehicles, said wheel further comprising:

an axle;

a circular stator fixed to said axle;

a wheel hub mounted on said axle for turning thereon;

an outer end backiron fixed to an inside surface of said wheel hub;

outer end permanent magnets fixed to said outer end backiron, said magnets being arranged in alternating polarities;

a rotor housing extending from an inner surface of said wheel hub inwardly of said wheel;

an outer rotor backiron extending inwardly from said outer end backiron and extending concentrically with and adjacent to said rotor housing;

rotor outer permanent magnets in alternating polarities fixed to said outer rotor backiron and opposing a peripheral edge of said stator;

said stator and said outer end permanent magnets defining therebetween a first gap, and said stator peripheral edge and said rotor outer permanent magnets defining therebetween a second gap;

a wheel rim fixed to said wheel hub and extending inwardly of said wheel, said wheel rim extending around said rotor housing;

a second wheel hub mounted on said axle for turning thereon;

an inner end backiron fixed to an inside surface of said second wheel hub;

inner end permanent magnets fixed to said second hub backiron, said inner end permanent magnets being arranged in alternating polarities;

said rotor housing being fixed to said second wheel hub;

said stator and said second inner end permanent magnets defining therebetween a third gap; and said wheel rim being fixed to said second wheel hub;

whereby said excitation of said stator exerts a turning force on said outer end permanent magnets, said rotor outer permanent magnets and said inner end permanent magnets, to cause rotations of said wheel.

4. Vehicle electric motor propulsion apparatus comprising:

an axle;

a stator drum fixed to said axle;

a plurality of electrically conductive windings disposed on said stator drum with each winding extending across a first lateral face of said stator drum and across a peripheral edge of said stator drum;

a rotor drum rotatably mounted on said axle and adjacent said stator drum;

a like plurality of first permanent magnets fixed to a lateral surface of said rotor drum and opposing said windings on said stator drum first lateral face, to form a first gap between said first permanent magnets and said windings on said stator drum first lateral face;

a cylindrically-shaped support structure extending from said rotor disk to surround said peripheral edge of said stator drum;

a second like plurality of permanent magnets fixed to an inside surface of said rotor disk support structure and opposing said windings on said stator drum peripheral edge, to form a second gap between said second permanent magnets and said windings on said stator drum peripheral edge;

a source of polyphase alternating electrical current coupled to said plurality of windings to excite successively disposed windings with different current phases;

said electrically conductive windings disposed on said stator drum extending across a second lateral face of said stator drum;

a second rotor disk rotatably mounted on said axle and fixed to said support structure; and a third like plurality of permanent magnets fixed to a lateral surface of said second rotor disk and opposing said windings on said stator drum second lateral face, to form a third gap between said third permanent magnets and said windings on said stator drum second lateral surface.

* * * * *